(12) United States Patent
Grant et al.

(10) Patent No.: US 8,506,369 B2
(45) Date of Patent: Aug. 13, 2013

(54) PROGRAMMABLE GAME-BASED HAPTIC ENABLED GUN CONTROLLER

(75) Inventors: Danny A. Grant, Laval (CA); Erin Ramsay, Montreal (CA); Ali Modarres, Montreal (CA); David M. Birnbaum, Oakland, CA (US); Juan Manuel Cruz-Hernandez, Montreal (CA); Robert W. Heubel, San Leandro, CA (US); Hendrik Bartel, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 489 days.

(21) Appl. No.: 12/652,599

(22) Filed: Jan. 5, 2010

(65) Prior Publication Data

US 2010/0173686 A1 Jul. 8, 2010

Related U.S. Application Data

(60) Provisional application No. 61/142,864, filed on Jan. 6, 2009.

(51) Int. Cl.
*A63F 13/00* (2006.01)
(52) U.S. Cl.
USPC .......... 463/2; 436/3; 436/30; 436/36; 436/37; 434/401
(58) Field of Classification Search
USPC .................. 463/2, 37, 3, 30, 36; 434/401
See application file for complete search history.

(56) References Cited

U.S. PATENT DOCUMENTS

| 6,020,876 | A | 2/2000 | Rosenberg et al. ........... 345/157 |
| 6,271,833 | B1 | 8/2001 | Rosenberg et al. ........... 345/161 |
| 6,672,962 | B1 * | 1/2004 | Ozaki et al. ..................... 463/37 |
| 6,785,996 | B2 * | 9/2004 | Danner et al. ............... 42/70.08 |

(Continued)

FOREIGN PATENT DOCUMENTS

| EP | 1002559 A1 | 5/2000 |
| EP | 1293237 A2 | 3/2003 |
| JP | 7024147 A | 1/1995 |
| JP | 7204356 A | 8/1995 |

OTHER PUBLICATIONS

International Search Report and Written Opinion in International Application No. PCT/US2010/020143, mailed Oct. 18, 2010.

(Continued)

*Primary Examiner* — Pierre Eddy Elisca
*Assistant Examiner* — Shahid Kamal
(74) *Attorney, Agent, or Firm* — Medler Ferro PLLC (57) ABSTRACT

Various systems, game controllers, and methods for simulating various objects such as weapons are provided. For example, a game controller may include a trigger, a processor within the body that receives a trigger signal when the trigger is activated by the user. The processor may communicate with a computer running a software program such as a gaming application, and an actuator coupled to the trigger, the actuator configured to output a haptic effect to the trigger in response to receiving a control signal from the processor. The game controller may simulate a gun and generate a recoil effect. In some embodiments, the recoil effect may be generated by impacting a moving mass from a discharge end of the gun to a handle end of the gun. In some embodiments, the recoil effect may be generated by using a body part of a user as a tether.

18 Claims, 8 Drawing Sheets

(56) References Cited

U.S. PATENT DOCUMENTS

| | | |
|---|---|---|
| 2003/0186742 A1 | 10/2003 | Lin |
| 2007/0215137 A1* | 9/2007 | Jones et al. .................... 124/82 |
| 2009/0202975 A1* | 8/2009 | Bolick et al. ................. 434/401 |
| 2010/0077959 A1* | 4/2010 | Treloar et al. ................ 118/681 |
| 2010/0206282 A1* | 8/2010 | Italia et al. ................... 124/51.1 |

OTHER PUBLICATIONS

International Preliminary Report on Patentability in International Application No. PCT/US2010/020143, dated Jul. 12, 2011.

* cited by examiner

PROGRAMMABLE GAME-BASED HAPTIC ENABLED GUN CONTROLLER

CROSS-REFERENCE TO RELATED APPLICATIONS

This application claims priority to U.S. Provisional Patent Application Ser. No. 61/142,864, filed Jan. 6, 2009, which is hereby incorporated by reference herein in its entirety.

TECHNICAL FIELD

The present disclosure relates generally to a programmable game-based haptic enabled gun controller.

BACKGROUND

Video games and video game systems have become even more popular due to the marketing toward, and resulting participation from, casual gainers. Popular video game systems like the PLAYSTATION 3 and XBOX have shooting games in which regular palm-type controllers are used to move and operate a weapon. These systems may utilize controllers that output haptic effects which are presented to the user. The WII system utilizes a WIIMOTE controller which can fit into a plastic shell-shaped gun, whereby the WIIMOTE can provide limited haptic effects which are felt by the user during playing a gun game.

However, none of the existing systems or games are configured to provide the user with a gun controller that provides extreme realism which allows the user to be immersed in the gaming experience.

SUMMARY

The invention addressing these and other drawbacks in the art relates to systems, game controllers, and methods for simulating various objects such as weapons. For example, a game controller may include a body having a handle adapted to be grasped by a user, a trigger coupled to the body adapted to be operated by the user's finger, a processor within the body and configured to receive a trigger signal from the trigger when the trigger is activated by the user, the processor configured to communicate with a computer running a software program, and an actuator coupled to the trigger, the actuator configured to output a haptic effect to the trigger in response to receiving a control signal from the processor.

In some embodiments, a method of generating a recoil effect on a controller may include detecting a trigger signal, moving a mass, by an actuator in response to the trigger signal, from a first position at a discharge end of the controller in a first direction toward a second position, releasing the mass, by the actuator, at the second position such that the mass travels from the second position in the first direction to an end stop at a handle end of the controller and impacts the end stop using momentum from the actuator, where the impact generates the recoil effect.

In some embodiments, a method of generating a recoil effect remote from a controller may include detecting, by a recoil device remote from the controller, a trigger signal originating from the controller such that the recoil device contacts a first location of a body of the user and the controller contacts a second location of the body of the user. The controller may be operated by the user to control a gaming application. The method may further include causing, by the recoil device in response to the trigger signal, a recoil effect to be output to a user at the first location remote from the second location.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of a programmable game-based haptic enabled gun controller. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
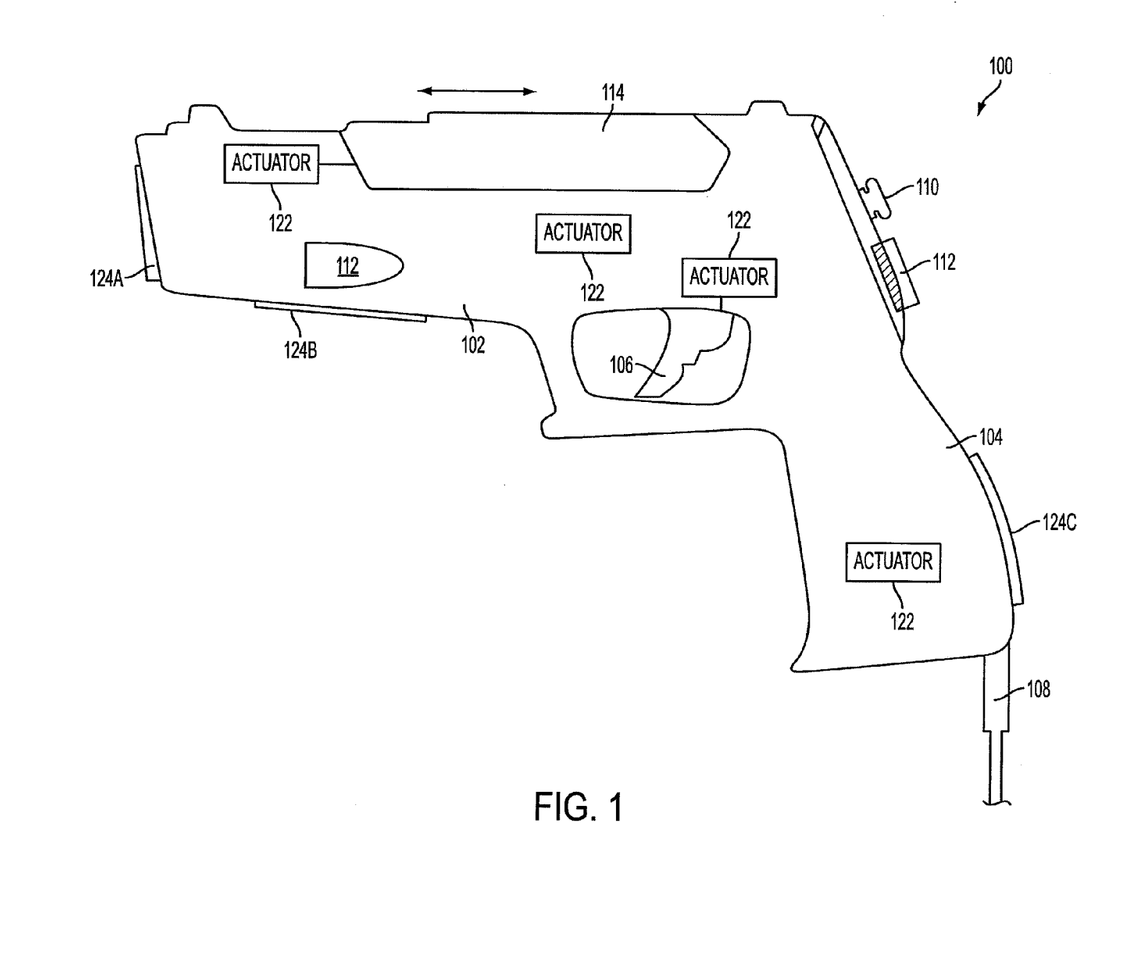
FIG. 1 illustrates a side view of an example game controller in accordance with an embodiment.

FIG. 1 illustrates a schematic of a haptically enabled gun controller for use with a video game in accordance with an embodiment. As shown in FIG. 1, the controller 100 includes a body 102, a handle 104, a trigger 106, an input/output port 108 which may be wired, as shown, or wireless using any appropriate known technology. It should be noted that the gun controller shown in FIG. 1 is only an example and any other design of gun is contemplated. For instance, the controller may be designed to look like a semi-automatic or automatic rifle, shotgun, grenade launcher, and the like.

The particular controller 100 shown in FIG. 1 includes one or more directional-pad controllers 110 as well as one or more buttons 112 to operate various features during game play. In an embodiment, the controller 100 may include a slidable barrel 114 which the user may slide back and forth (as shown by the arrow) to load a virtual bullet into the chamber after the weapon is loaded. In addition, the controller 100 includes one or more actuators 122 located within various locations of the controller. More details regarding the different actuators are discussed below, although the same reference numeral is referred to for all actuators for clarity purposes.

Figure 2:
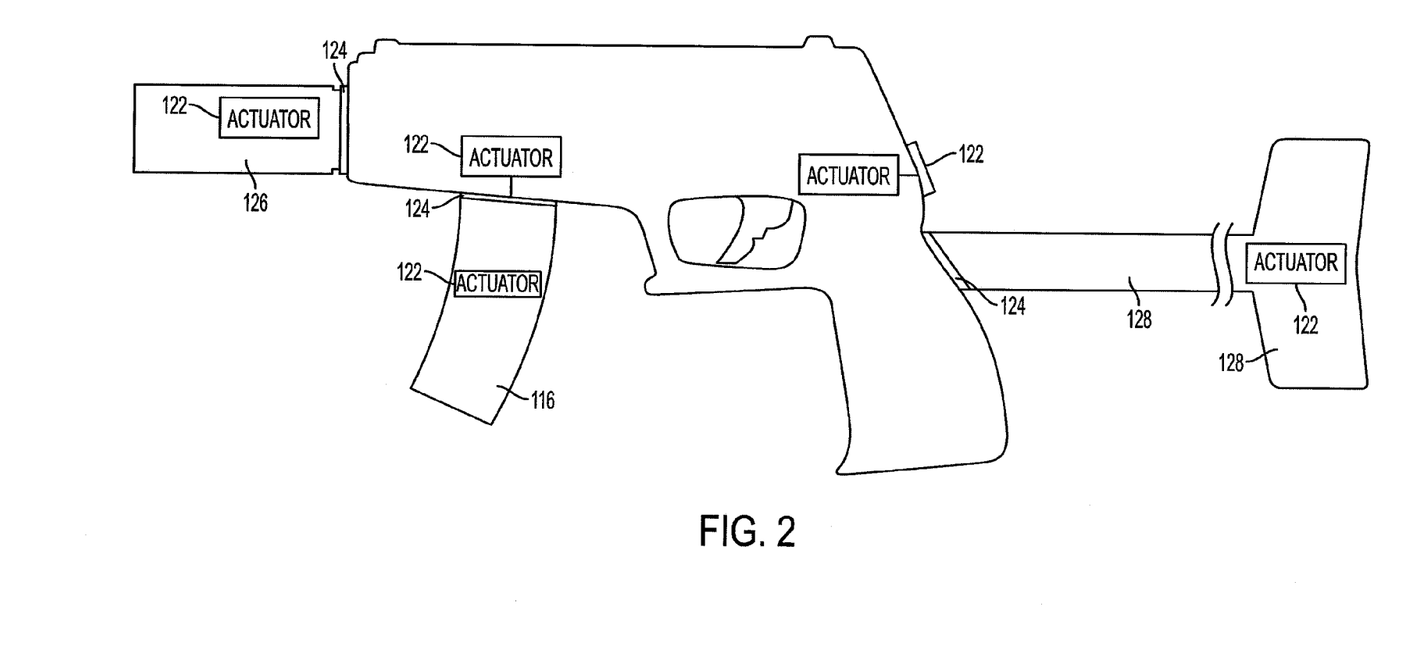
FIG. 2 illustrates a side view of an example game controller in accordance with an embodiment.

In an embodiment, the gun controller 100 is reconfigurable to allow the user to expand the same base controller 100 into a rifle, shotgun or semi-automatic/automatic gun, as shown in FIG. 2. In particular, the controller 100 shown in FIGS. 1 and 2 includes an external component port 124 at the end of the barrel 124A, under the barrel 124B, and at the rear side of the handle 124C, although component ports 124 may be located elsewhere. It is also contemplated that any number of component ports (if any) are configured on the controller 100.

In the embodiment shown in FIG. 2, the controller 100 may be configured to engage removable stock and barrel components which would allow the user to use the controller like a rifle. In particular, the controller in FIG. 2 is shown to have an extended barrel 126 coupled to the controller 100 at port 124A, an additional handle (or cartridge) 116 coupled to the controller 100 at port 124B, and a stock butt 128 coupled to the controller at port 124C. It is preferred, however, that the center of mass of the controller 100 changes as external components are attached or removed from the base 102, whereby the change in the center of mass may adjust the weight and/or control of the controller (e.g. heaver when in a rifle configuration, lighter when in a regular pistol configuration). The detachable components may be hollow or made of a material which allows haptic effects from the base to be sufficiently felt at the attached component, which will be discussed in more detail below.

In an embodiment, as shown in FIG. 2, any or all of the detachable components 116, 126, 128 include one or more actuators 122 therein, whereby the component is electrically connected to the base 102 when attached thereto to allow the actuators 122 to operate in conjunction with the controller 100. The actuators 122 within the detachable components would thus preferably be connected to the base 102 and would receive respective control signals to activate those actuators 122 to output various haptic effects to the user. For example, the butt 128 of the stock may be designed to include one or more actuators 122 which activate in response to receiving a control signal from the processor (see FIG. 3). Upon receiving the control signal, the actuator 122 in the butt 128 would be configured to output a haptic effect which is directly felt in the user's arm (i.e. simulate recoil). It is contemplated that the handle (or cartridge) 116 also includes an actuator 122 therein electrically coupled to the controller 100, whereby the actuator 122 may output a vibration or pulse upon the controller 100 being "fired" by the user. Similarly, the extended barrel 126 may include an actuator 122 therein that is electrically coupled to the controller 100, whereby the actuator 122 may output a vibration or pulse upon the controller 100 being fired by the user. Although not shown, the controller 100 may be configured to engage a tri-pod and/or scope to use the controller 100 as a sniper rifle.

The controller 100 is preferably configured to provide the user with the physically satisfying experience of simulating the act of reloading the weapon. As mentioned, the port 124 of the controller 100 may be a cartridge bay which allows the user to insert and remove a cartridge. The controller 100 may be configured to allow the use of double sided clips, whereby the user may pull the cartridge out and then re-set it. One or more actuators 122 of the controller 100 be programmed to output a haptic effect, such as a pulse, to indicate that the cartridge has been engaged. In an example, the controller 100 may utilize button 112 which the user presses, whereby a spring-like haptic effect may be output by the actuator 122 onto the button 112 to simulate the weapon being cocked. Additionally or alternatively, the controller 100 may be configured to allow the simulation of loading shotgun shells.

Figure 3:
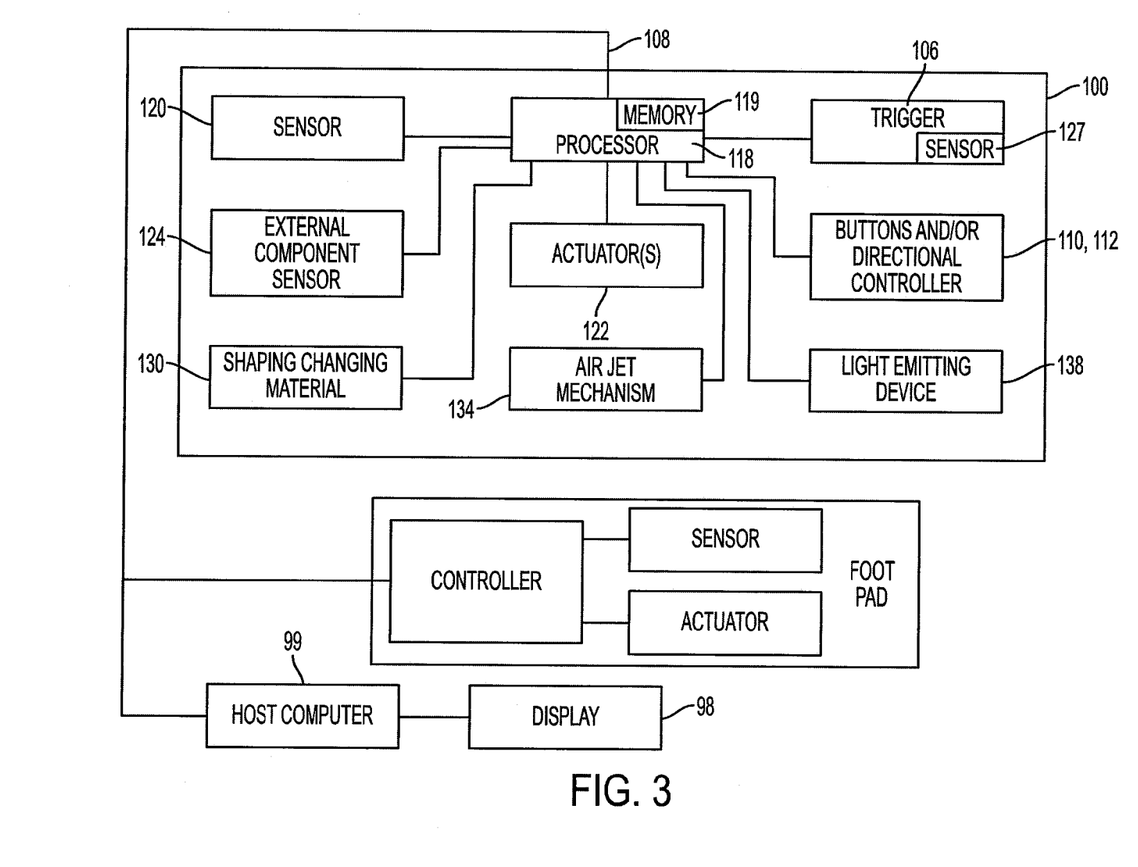
FIG. 3 illustrates a block diagram of a game controller in accordance with an embodiment.

FIG. 3 illustrates a block diagram of the gun controller in accordance with an embodiment. As shown in FIG. 3, the controller 100 preferably includes a local processor 118 which communicates with a video game console 99 (hereinafter referred to as well as the "host computer"). In an embodiment, transceiver port 108 connects the controller 100 to the host computer 99 via a wire. In another embodiment, the transceiver port 108 wirelessly connects the controller 100 to the host computer 99. The host computer 99 is preferably coupled to a display 98 which displays the graphical environment of the video game. The controller 100 may be alternatively configured to not include the local processor 118, whereby all input/output signals from the controller 100 are handled and processed directly by the host computer 99.

The local processor 118 is preferably coupled to the controller trigger 106, the directional-pad controller(s) 110 (if any), the button(s) 112 (if any), one or more sensors 120, one or more actuators 122 as well as one or more optional external component ports 124. The processor 118 may also be coupled to other components, such as a shape changing material 130 of the body, one or more light emitting devices 132 on the exterior of the body and an air jet mechanism 134. It should be noted that the schematic shown in FIG. 3 is an example and not all of the components need to be incorporated into the controller 100.

With regard to the one or more actuators 122 of the controller, the local processor 118 provides haptic effect signals to the actuators 122 based on high level supervisory or streaming commands from the host computer 99. In the streaming embodiment, the voltage magnitudes and durations are streamed to the controller 100 where information is provided by the host computer 99 to the actuators 122. In operation, the host computer 99 may provide high level commands to the local processor 118 such as the type of haptic effect to be output (e.g. vibration, jolt, detent, pop, etc.) by one or more selected actuators, whereby the local processor 118 instructs the actuator as to particular characteristics of the haptic effect which is to be output (e.g. magnitude, frequency, duration, etc.) The haptic effects thereby provide the user with the feeling that the controller 100 has come alive during game play, as would a real gun when used.

In an embodiment, the controller 100 is weapon-shaped, whereby the local processor 118 is preferably housed within the controller 100 and is not easily removable from the body of the controller 100 (e.g. XBOX, PLAYSTATION 3, etc.). In an embodiment, the local processor 118 is within a dedicated video game controller (e.g. WII remote control), whereby the weapon controller 100 is a shell which is configured to receive the dedicated video game controller therein. It is also contemplated that the controller 100 shell may include a dedicated local processor in addition to the processor 118 in the video game controller, whereby processing duties, communications and instructions are efficiently routed between the multiple processors to achieve greater speed, bandwidth, and flexibility.

The sensor 120 preferably monitors position and/or movement of the controller 100 (e.g. accelerometer) to track the position of the gun and provides sensor signals to the processor 118. The processor 118 preferably transmits these sensor signals to the host computer 99 to dynamically operate the user's character and/or gun shown on the display 98 during game play. Additionally or alternatively, the sensor 120 may be configured to provide sensor signals directly to the host computer (shown by line 120A). More details of the sensor 120 are discussed below.

The trigger 106 is coupled to the processor 118 whereby the trigger, when depressed, preferably outputs a trigger signal to the processor 118 to indicate that the user intends to shoot the weapon. The processor 118 and/or host computer 99 preferably determines whether the user is pointing to a designated target on the screen when the trigger 106 is pressed, and if the determination is affirmative, the target will be shown on the display 98 as being hit. In contrast, if the determination is negative, the target will be shown on the display as not being hit.

As shown in FIGS. 1 and 3, the controller 100 includes one or more actuators 122 coupled to the trigger 106 (hereinafter referred to as a "trigger actuator"). In an embodiment, the trigger actuator 122 is configured to output a haptic effect upon receiving a control signal from the processor 118, whereby the haptic effect provides the user with a realistic sensation of what the trigger of a real gun would feel like when operated. In an embodiment, a sensor 127 is coupled to the trigger to measure the distance that the trigger is moved by the user's finger. Such measured data is preferably used to utilize haptic effects having position-based and/or time-based components.

The actuator may output a haptic effect which incorporates any waveform having a position-based component and a predetermined time-based component. In other words, the position-based component is utilized to track the position of the trigger, whereby the predetermined time-based component is played when the position of the trigger has been reached. The predetermined time-based component can be based on a predefined waveform that is output as a function of time (i.e., defined before it is output). A predetermined time-based component, for example, can be stored in a processor-readable medium for retrieval by the processor 118 or other controller. For example purposes only, a predetermined time-based component can be a pulse waveform that has a maximum force and a duration of 75 ms. This waveform may be stored in, for example, a memory 119 and retrieved by a processor 118 when the processor 118 receives an indication that the trigger is at a desired position.

The position-based component can include, for example, a base-line waveform. In an embodiment, the position-based component can be a physical or a virtual spring force. In an embodiment, the position-based component of the haptic effect can be a sinusoidal detent profile, such as a series of pulses imparted onto the trigger 106. Any base-line waveform in which the output force is a function of the position of the trigger may be used as the position-based component.

It is contemplated that the predetermined time-based waveform of the haptic effect can include a waveform having characteristics that are alterable based on detectable conditions. In one embodiment, the magnitude of the predetermined time-based waveform may be changed based on a detected instantaneous velocity of the trigger 106 as it is being moved. In an alternative embodiment, the duration of the predetermined time-based waveform can be changed based on a detected instantaneous velocity of the trigger 106. In an embodiment, the duration and the magnitude of the predetermined time-based waveform can be changed based on a detected instantaneous velocity of the trigger. The controller can acquire a predetermined time-based waveform having different magnitudes depending on the detected velocity of the trigger. More details regarding time-based and position-based haptic effects are discussed in U.S. Pat. No. 7,283,120, assigned to Immersion Corporation.

As such, the trigger actuator 122 is programmable, whereby the actuator 122 can be set to output the haptic effect based on the sensed distance that the trigger is pressed by the user. For example, if the user is operating a revolver in the game, the trigger actuator 106 may be programmed to output a click or other haptic effect when the user presses the trigger past a desired position along the entire permitted distance of movement. In another example, if the user is operating an automatic rifle in the game, the trigger actuator 106 may be programmed to output a series of clicks or other haptic effects when the user presses the trigger only a slight distance from the neutral position. In yet another example, the trigger actuator 106 may be configured to output a resistive force toward the neutral position based on the type of gun the user is supposed to be handling. For lighter guns, such as pistols, the resistive force would be relatively less than with a heavier gun (e.g. Magnum) which would have a higher resistive force applied to the user's finger. In an embodiment, the user may choose through the controller 100 or the software to customize and set the threshold distance upon which the trigger actuator 122 will activate and/or the type of haptic effect which the trigger actuator 122 will output. In some embodiments, a simulated weapon may include modifications that may be taken into account when generating the resistive force. For example, a user may operate a handgun having a silencer in the game. The effects of the silencer, such as weight, shape, or other effect of the silencer may be taken into account when generating the resistive force. Thus, when the handgun, for example, includes a silencer, the resistive force may be different as compared to when the handgun does not include the silencer.

In an embodiment, the controller 100 includes one or more actuators 122 in the body, whereby the actuator 122 outputs a haptic effect to the body 102 to provide the user with a feeling that the weapon is actually discharging. It should be noted that the actuators 122 are shown in FIG. 2 in the body, although multiple actuators 122 are contemplated at different locations on the body. In an embodiment, the body actuator 122 is programmable, whereby the actuator 122 is set to output varying haptic effects to the body 102 and/or handle 104 based on the type of the gun being simulated (e.g. semi-automatic, automatic, laser, etc.). Additionally or alternatively, the actuator 122 may be programmable to output varying haptic effects based on the weight and/or caliber of the gun being simulated. For example, if the user is operating a revolver in the game, the body actuator 122 may be programmed by the software to output a single pulse when the user presses the trigger. In another example, if the user is operating an automatic or semi-automatic rifle in the game, the body actuator 122 may be programmed by the software to output a series of pulses to the body 102 when the user presses the trigger, thereby mimicking an automatic or semi-automatic rifle. The magnitude of the haptic effect output by the actuator may be varied depending on what type of the gun is being simulated (e.g., revolver vs. shotgun) as instructed by the software. In an embodiment, the user may choose through the controller 100 or the software to customize and set the type of haptic effect which the body actuator 122 will output.

The actuator 122 may be programmed by the software to output distinctive haptic effects for different kinds of weapons. For instance, the acceleration and/or frequency of the haptic effect may vary depending on mass, caliber, use (one hand vs. two) of the weapon. The trigger actuator and/or body actuator 122 may also output a distinctive haptic effect click when the user is firing an empty weapon. This empty click could also differ based on the type of weapon being operated by the user.

In an embodiment, the controller 100 includes an actuator 122 within the handle 104 or stock butt, whereby the actuator 122 is configured to output a haptic effect which represents a recoil effect (hereinafter referred to as a "recoil actuator"). It is preferred that the recoil actuator 122 is programmable by the software to output a recoil force which differs based on the type of weapon that the user is operating. For example, if the controller 100 is configured to have a stock butt which sits against the user's arm or shoulder, a recoil actuator 122 in the body and/or the butt output a force, vibration, or other haptic effect which is felt as a shaking or moving of the user's arm or shoulder to give the recoil effect. It is possible to adjust the recoil to cause the butt or handle to move upward relative to the user's body, whereby the user's body is used as leverage to cause the handle or butt to move upward. The system may be configured such that the sensor 120 provides a sensor signal of the location where the barrel is pointed immediately after the recoil is output. This would provide the user with a more realistic experience of the difficulty of successfully hitting a target when the weapon has a substantial recoil effect.

As mentioned above, the controller 100 may include a slider 114 in an embodiment, whereby the user may slide the slider 114, as with a real weapon, to ready the weapon for firing. The controller 100 may include an actuator 122 coupled to slider 114, whereby the actuator outputs a haptic effect to be felt by the user as the slider 114 is slid along the body 102. In an embodiment, the actuator 122 is programmed by the software to output different haptic effects based on the direction which the slider 114 is moved. For example, as the slider 114 is moved toward the handle 102 of the weapon, the actuator 122 may be programmed by the software to output a resistive force much like a real slider mechanism. The actuator 122 may also be programmed to output a haptic effect (e.g., a click or pulse) when the slider 114 is moved a predetermined (or maximum) distance, such as to represent that the weapon is cocked. In the same example, as the slider 114 is moved back toward its default position, the actuator 122 may be programmed to output a same or different haptic effect (such as an assistive force) which is felt by the user. Additionally or alternatively, a spring or other urging member may be coupled to the slider 114, whereby the spring applies the resistive and/or assistive forces to the slider 114 as it is moved.

In an embodiment, all or a portion of the controller 100 may be made of materials which react based on the amount of controller 100 use during game play. In particular, the materials of the controller 100 may be configured to change color and/or its exterior dimension based upon receiving a signal from the processor 118. For example, excessive rate of fire could cause result in the barrel heating up as a precursor to a weapon jam. In this example, the processor 118 receives the amount of times the trigger is activated (or held down) in a set amount of time. Upon the processor 118 determining that the number of trigger activations exceed a predetermined threshold, the processor 118 sends a signal to the controller coupled to the material, whereby the material expands/contracts and/or changes color. The material is preferably configured to gradually expand/contract and/or change color as the trigger activations continue after exceeding the threshold. In an embodiment in which the body changes color, the body 102 may include a series of light emitting diodes (LED) or other light emitting devices 132 which gradually illuminate as the weapon "heats up". In some embodiments, actuator 122 is a temperature actuator that regulates the temperature of controller 100. For example, the temperature actuator may provide heat to the weapon to mirror the temperature of the virtual weapon in gameplay. In an embodiment, the trigger actuator may receive a signal from the processor to output a hard stop haptic effect onto the trigger after a maximum number of trigger activations are tracked in the set amount of time. This hard stop haptic effect would simulate the weapon seizing due to overheating.

In an embodiment, the controller 100 includes one or more air jets 134 in the body and/or in a detachable component to provide the user with a different type of haptic effect when an event occurs during game play. The air jet is preferably positioned near the rear of the controller and faces back at the user, although the air jet may be placed anywhere else and/or positioned at any desired direction on the controller. The air jet can be used to expel air at the user when the weapon jams or a virtual bullet gets stuck in the chamber. In an embodiment, the air jet may expel air when the user's character on the display screen 98 takes a hit or is damaged. It is contemplated that other media besides air may be expelled, such as water, electrical charge (for electrotactile stimulation), etc. In an embodiment, an air compressor or cartridge is positioned within the body 102 whereby the compressor or cartridge discharges air when operated into a nozzle which expels the air out of the body (and towards the user). The compressor or cartridge may decrease in air pressure as the air is discharged, thereby giving a feeling of the weapon becoming effectively lighter. This effect could represent the weapon becoming lighter as the bullets are discharged.

In an embodiment, the controller 100 may include an accelerometer, gyroscope or other position-sensing technology which provides additional sensing capability of the controller 100 as it is moved during game play. In an embodiment, the user's character or gun displayed on the display screen 98 may adjust the position and/or orientation of the displayed weapon based on the sensed position of the controller 100 in the user's hands. For example, the displayed weapon would be shown in the proscribed vertical fashion when the accelerometer senses the controller 100 held vertically. In contrast, the displayed weapon would be shown to be held horizontally (e.g., an orientation used by gangsters and other villains in popular culture) when the accelerometer senses the user orienting the controller 100 horizontally. The haptic effects output by any or all of the controller's 100 actuator(s) may also change depending on sensed orientation of the controller 100. In another example, the software may be enabled to operate with the accelerometer to show the user's character twirling the gun on the display in response to the user twirling the controller 100. It is contemplated that the accelerometer may be used to shake loose a weapon jam (by shaking the controller), unlock the weapon for a secondary mode (e.g. using the grenade launcher), or to reload the weapon. In an embodiment in which the controller 100 simulates a shotgun, the accelerometer may track the user's quick upward movement of the controller to close the displayed shotgun after it is loaded. In an embodiment, the controller 100 is used with the software to play a quick draw game in which the user is duels with another player or the computer, whereby whoever draws from their holster and hits the opponent first wins the match. In this embodiment, the accelerometer tracks the speed at which the user's controller is moved from a downward position (such as in being in the user's holster) to pointing at the displayed opponent.

In an embodiment, the accelerometer in the controller 100 may be used to further influence game play. For example, the user may move the controller 100 after shooting a bullet to cause the bullet to alter its trajectory, such as curving around corners or imparting lateral acceleration of the bullet. In particular, the software run on the host computer changes the path of the bullet upon receiving sensor signals from the controller's accelerometer. For example, after the user pulls the trigger (and the bullet is along its trajectory), the user may move the controller upward, whereby the accelerometer, tracking such motion of the controller, sends sensor signals to the processor and ultimately to the host computer. The software program, upon receiving such sensor signals, causes the displayed bullet to move upward.

In an embodiment, the signals transmitted by the accelerometer may be used to measure and incorporate a user's 'steady-handedness' with the weapon when playing a game. For example, if the accelerometer may be configured to be extremely sensitive to the movements of the controller 100 when the user is operating the controller 100 as a sniper rifle in the game.

In an embodiment, the controller 100 may be used with a foot pad in which the foot pad includes one or more actuators which output haptic effects in response to receiving corresponding control signals from the host computer 99. For example, the user standing on the foot pad may feel vibrations or individual pulses through the user's feet to simulate the feel of shells dropping around the user depending on the rate of fire and the caliber of the weapon. In particular, the processor 118 provides control signals to the actuator in the foot pad in response to the controller 100 providing signals to the host computer indicating that the user is operating the trigger 106. It is preferred that the actuators in the foot pad output the haptic effects in delayed response to the trigger 106 being operated to simulate the time that the bullet falls from the weapon to the ground. It should be noted that the foot pad may output haptic effects in response to other events occurring during game play (grenade explosion near the user, etc.). The foot pad can further comprise a force actuator that shifts the balance of the user, to further simulate the recoil forces of the firearm. In some embodiments, controller 100 and/or the foot pad may provide gaming effects to communicate information such as game events that are unrelated to the weapon. The gaming effects may be haptic effects, audio effects, and/or visual effects. In an embodiment, controller 100 may simulate an advanced weapon that communicates alerts to the user such as when entering a hostile area during a combat game. When entering the hostile area, for example, controller 100 may provide a haptic effect or other gaming effect to alert the user.

In an embodiment, the controller 100 may include one or more pressure sensors, touch screens, capacitive buttons or like technology to track how the user is holding the controller. For clarity, pressure sensors will be referred to, although any other appropriate technology is contemplated. The pressure sensor may be used with the software program to gauge the consistency of the user's action and whether the user would likely hit the target. For instance, the pressure handle may indicate that the user is holding a shotgun or larger caliber gun with one hand. The host computer and software program, upon receiving this information, may be less likely to reward the user with a confirmed hit. The host computer may also show the user's character holding the displayed weapon with one or two hands (along with accurate representations of where the hands are on the displayed weapon) depending on whether the pressure sensors indicate the user holding the controller with one or two hands.

Figure 4:
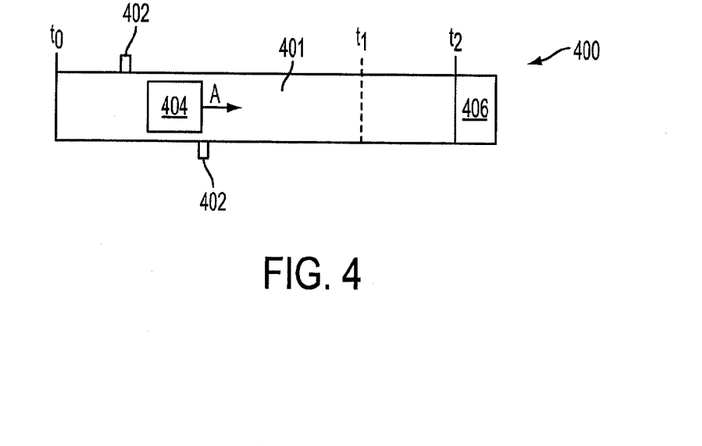
FIG. 4 is a block diagram of a recoil actuator that generates a recoil effect, according to various embodiments of the invention.

FIG. 4 is a block diagram of a recoil actuator 400 that generates a recoil effect, according to various embodiments of the invention. According to various embodiments of the invention, recoil actuator 400 includes, among other things, a cavity 401, a coil 402 coupled to cavity 401, a moving mass 404, and an end stop 406. Cavity 401 may include be any shaped cavity through which moving mass 404 may travel such as, for example, cylindrical, oval, square, curvilinear, and/or other shaped cavity. As illustrated in FIG. 4, coil 402 may be wrapped around cavity 401 or otherwise coupled to a surface of cavity 401. Recoil actuator 400 may include, for example, a linear voice coil actuator or other actuator configured to move moving mass 404 toward end stop 406.

In some embodiments, recoil actuator 400 may cause moving mass 404 to move in a first direction illustrated in FIG. 4 as arrow A through cavity 401 toward end stop 406. In some embodiments, moving mass 404 may be composed of metal or otherwise have magnetic properties. Recoil actuator 400 may apply a current through coil 402, thereby generating a magnetic field, which causes movement of moving mass 404 in the first direction. End stop 406 may be directly coupled to a housing or other component of a controller. Thus, impact of moving mass 404 with end stop 406 may generate the recoil effect to the controller.

In some embodiments, moving mass 404 may include different materials that provide different recoil effects depending on the material used. In some implementations, for example, moving mass 404 may be made from different materials that provide different impact sensations, thereby generating different recoil effects. In some implementations, at least a portion of moving mass 404 may include rubber (or other material), which changes the recoil effect as compared to when rubber is not used. For example, at least a portion of moving mass 404 may include a rubber portion that impacts end stop 406 and changes the recoil effect as compared to without the rubber portion. In some embodiments, end stop 406 may likewise include different materials that provide different recoil effects depending on the material used. Thus, in some embodiments, moving mass 404 and/or end stop 406 may include different materials that varies the haptic perception of the recoil effect.

In some embodiments, moving mass 404 is positioned at an origin position $t_0$ and is moved toward a position $t_1$. At position $t_1$, moving mass 404 is released and travels to position $t_2$, where moving mass 404 impacts end stop 406, thereby causing the recoil effect. In some embodiments, moving mass 404 is released by reducing the current applied to coil 402. In some embodiments, the current is reduced to zero. In some embodiments, moving mass 404 is released when moving mass 404 moves beyond a range of coil 402. For example, coil 402 may terminate at a position at or before position $t_1$. Thus, moving mass 404 is released when moved beyond position $t_1$.

In some embodiments, after impact with end stop 406, moving mass 404 may move from position $t_2$ to position $t_1$ or other position, where moving mass 404 is recaptured. Upon recapture, moving mass 494 may be moved in a second direction opposite the first direction toward position $t_0$ or other position. Thus, once the recoil effect is delivered via impact between moving mass 404 and end stop 406, recoil actuator 400 may recapture moving mass 404 in order to suppress unintended subsequent recoil effects. For example, recoil actuator 400 may provide a countering force that gradually increases over time to moving mass 404 after impact with end stop 306 in order to prevent undesirable or otherwise unintended recoil effects. In some embodiments, recoil actuator 400 may recapture moving mass 404 after a predefined period of time and/or number of impacts between moving mass 404 and end stop 306. Thus, moving mass 404 may impact end stop 406 a number of times before being recaptured by recoil actuator 400.

In some embodiments, the speed at which moving mass 404 is moved in the first direction may be varied to output different magnitudes of recoil. For example, moving mass 404 may be moved in the first direction at a higher speed to simulate a larger recoil for a larger simulated gun compared to a smaller simulated gun and vice versa. In some embodiments, different speeds are achieved by varying the current applied to coil 402.

In an example operation, a trigger signal indicating that a trigger (or other user interface input) has been actuated may be received. In response to the trigger signal, recoil actuator 400 may move moving mass 404 from position $t_0$ to position $t_1$, at which point recoil actuator 400 may release moving mass 404. Once released, moving mass 404 moves from position $t_1$ to position $t_2$ using momentum from recoil actuator 400. At position $t_2$, moving mass 404 impacts end stop 406, thereby causing the recoil effect. In some embodiments, recoil actuator 400 may recapture moving mass 404 at position $t_1$ (or other position). In some embodiments, upon recapture, recoil actuator 400 may return moving mass 404 to position $t_0$ or other position.

Figure 5A:
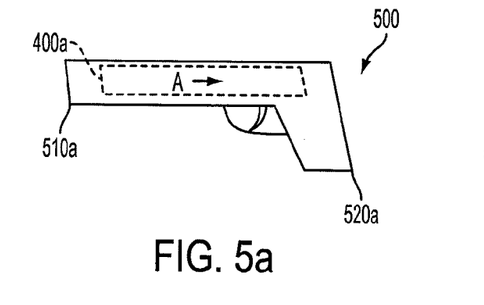
FIG. 5a is a block diagram of a controller, which includes a recoil component that generates a recoil effect, according to various embodiments of the invention.

FIG. 5a is a block diagram of a controller 500, which includes recoil actuator 400a that generates a recoil effect, according to various embodiments of the invention. Controller 500 may include, among other things, a discharge end 510a, a recoil actuator 400a, and a handle end 520a. In some embodiments, controller 500 is configured to resemble a gun. Recoil actuator 400a may be positioned substantially parallel along a gun shaft of controller 500.

In some embodiments, a user may point discharge end 510a away from the user toward a screen or other interface in order to simulate a shot. Handle end 520a may be positioned toward the user. Thus, when controller 500 is grasped by the user to simulate a shot at a screen or other interface, discharge end 510a may be positioned away from the user while handle end 520a may be positioned toward the user. In these embodiments, the first direction described above in FIG. 4 may be from discharge end 510a to handle end 520a.

Figure 5B:
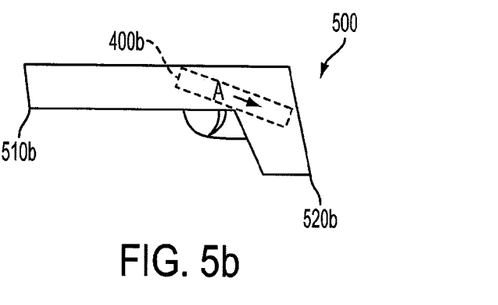
FIG. 5b is a block diagram of a controller, which includes a recoil component that generates a recoil effect, according to various embodiments of the invention.

FIG. 5b is a block diagram of a controller 500, which includes recoil actuator 400b that generates a recoil effect, according to various embodiments of the invention. Controller 500 may include, among other things, a discharge end 510b, a recoil actuator 400a, and a handle end 520b. In some embodiments, controller 500 is configured to resemble a gun. Recoil actuator 400a may be positioned at a recoil angle offset from a gun shaft of controller 500. In some embodiments, the positioning of recoil component causes a recoil effect force vector having a direction substantially perpendicular with a direction illustrated by the arrow A of motion of a moving mass, such as moving mass 404 illustrated in FIG. 4. Thus, by varying the recoil angle, a recoil effect force vector may be varied. In some embodiments, a user may point discharge end 510b away from the user toward a screen or other interface in order to simulate a shot. Handle end 520b may be positioned toward the user. Thus, when controller 500 is grasped by the user to simulate a shot at a screen or other interface, discharge end 510b may be positioned away from the user while handle end 520b may be positioned toward the user. In these embodiments, the first direction described above in FIG. 4 may be from discharge end 510b to handle end 520b.

Figure 5C:
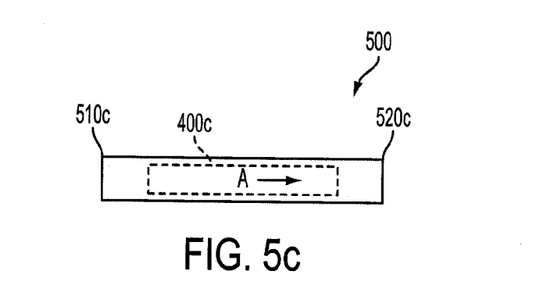
FIG. 5c is a block diagram of a controller, which includes recoil component that generates a recoil effect, according to various embodiments of the invention.

FIG. 5c is a block diagram of a controller 500, which includes recoil actuator 400c that generates a recoil effect, according to various embodiments of the invention. Controller 500 may include, among other things, a discharge end 510c, a recoil actuator 400a, and a handle end 520c. In some embodiments, controller 500 is not shaped as a gun. In these embodiments, recoil actuator 400c may be positioned in a manner similar to those illustrated in FIGS. 5a and 5b. In other words, recoil actuator 400c may be positioned substantially parallel along a plane that spans a length of controller 500 or offset to intersect the plane. In some embodiments, the first direction may be from discharge end 510c toward handle end 520c.

In some embodiments, controller 500 may include one or more of a recoil actuator 400a and/or a recoil actuator 400b. Thus, although FIGS. 5a, 5b, and 5c illustrate a single recoil actuator 400, those having skill in the art will appreciate that different numbers, combinations, and/or configurations of recoil actuator 400 may be used.

Figure 6A:
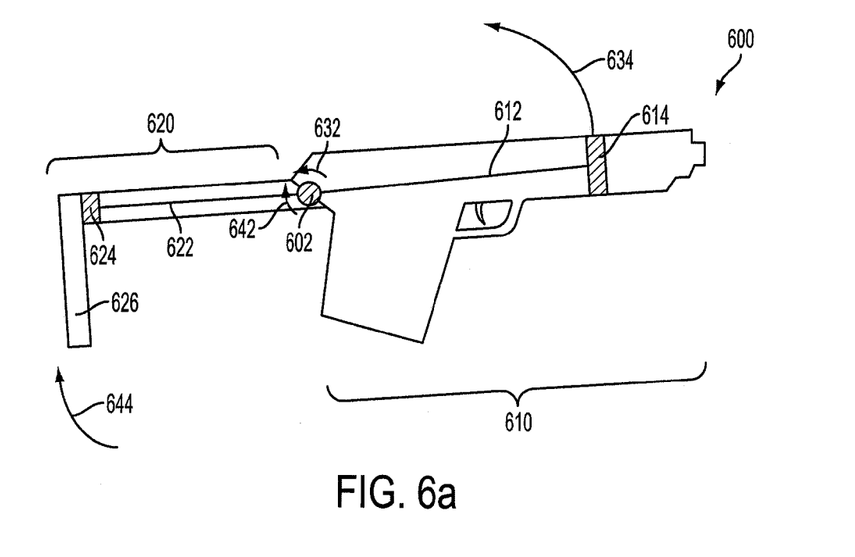
FIG. 6a is a cross-sectional illustration of a controller that generates a user-grounded recoil effect, according to various embodiments of the invention.

FIG. 6 is a cross-sectional illustration of a controller 600 that generates a user-grounded recoil effect, according to various embodiments of the invention. According to various embodiments of the invention, controller 600 may include, among other things, an actuator 602, a controller base 610, a linkage 612, a controller anchor 614, a grounding base 620, a linkage 622, a grounding anchor 624, and a user engaging component 626. Controller base 610 may be movably coupled to grounding base 620. In some embodiments, controller base 610 is coupled to grounding base 620 via a hinge (not illustrated in FIG. 6a). In some embodiments, actuator 602 may be coupled to controller anchor 614 and grounding anchor 624 via linkage 612 and linkage 622, respectively. Linkage 612 may be any rigid structure such as a wire through which actuator 602 imparts a force on controller anchor 614. Similarly, linkage 622 may be a rigid structure through which actuator 602 imparts a force on grounding anchor 624. User engaging component 626 is a structure for fastening grounding base 620 to a body part of a user such as a forearm. For example, user engaging component 626 may include a VELCRO strap, string, fabric, and/or other structure for fastening grounding base 620 to a body part of the user. In some embodiments, user engaging component 626 wraps around a body part of user 650. For example, user 650 may slide a forearm through user engaging component 626, then grasp controller 600. In other embodiments, the engaging component sits naturally against the forearm in such a way that force can be applied to the forearm when the handle is gripped.

In some embodiments, actuator 602 is configured to impart a force on controller anchor 614 via linkage 612. In some embodiments, the imparted force is a pulling force 632 that results in a force vector 634. Force vector 634 causes controller base 610 to move in a direction of force vector 634 relative to a body part of user 650 (illustrated in FIG. 6b) thereby causing the recoil effect. In some implementations, controller anchor 614 may be positioned at a discharge end of controller 600. Thus, force vector 634 may cause the recoil effect in a direction from the distal end of controller 600 toward a user grasping controller 600.

In some embodiments, force vector 634 may cause a force vector 644 to be imparted on grounding base 620. For example, actuator 602, linkage 612 and linkage 622 may be coupled to a wound spool such that pulling force 632 causes force vector 634 and force vector 644. Thus, pulling force 632 may urge together controller base 610 and grounding base 620 according to force vector 634 and force vector 644.

Figure 6B:
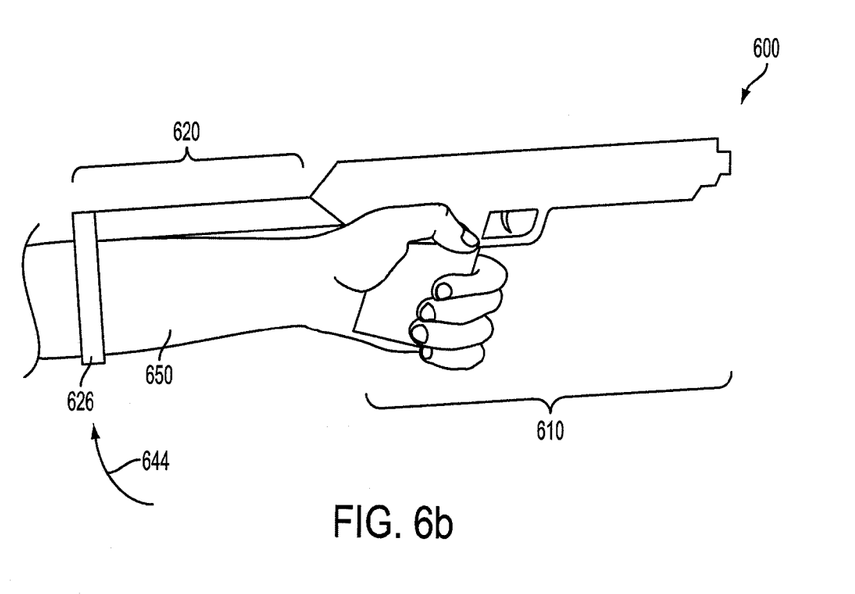
FIG. 6b is a block diagram of a controller that generates a user-grounded recoil effect, according to various embodiments of the invention.

When controller 600 is configured to be grasped by user 650 as illustrated in FIG. 6b, user engaging component 626 may fasten grounding base 620 to user 650. Otherwise, in these embodiments, controller 600 may not be grounded and may not generate the recoil effect. Thus, instead of existing systems that may use a wall, desk, or other object apart from user 650, controller 600 may be grounded using a body part of user 650.

In some embodiments, actuator 602 is configured to impart a force on grounding anchor 624 via linkage 622. In some embodiments, the imparted force is a pulling force 642 that results in a force vector 644. Force vector 644 causes grounding base 620 to move in a direction of force vector 644 relative to a body part of user 650 (illustrated in FIG. 6b).

In some embodiments, actuator 602 imparts a combination of force vector 634 and force vector 644 to thereby impart the recoil effect. In some embodiments, the magnitude of forces generated by actuator 602 may be varied to simulate different levels of recoil effects, such as a greater recoil effect for a larger simulated gun as compared to a smaller simulated gun.

FIG. 6b illustrates a controller 600 that generates a user-grounded recoil effect as grasped by user 650, according to various embodiments of the invention. According to the embodiments illustrated by FIG. 6b, grounding base 620 (as illustrated in FIG. 6a) is positioned such that vector force 644 causes grounding base 620 to move away from a body part of user 650. For example, grounding base 620 may be positioned above a forearm of user 650 when controller 600 is grasped in an upright position as illustrated. User engaging component 626 fastens controller 600 to user 650, thereby holding grounding 620 substantially in place relative to user 650 as the recoil effect is delivered by controller 600. Thus, by coupling controller 600 to a body part of user 650 via user engaging component 626, vector force 644 is opposed by the body part of the user.

Figure 7A:
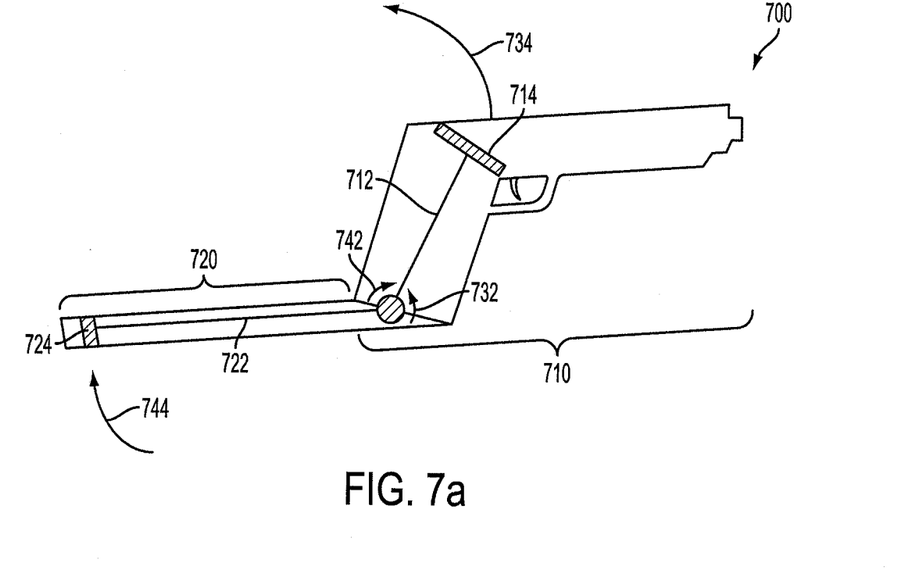
FIG. 7a is a block diagram of a controller that generates a user-grounded recoil effect as held by a user, according to various embodiments of the invention.

FIG. 7a is a cross-sectional illustration of a controller 700 that generates a user-grounded recoil effect, according to various embodiments of the invention. According to various embodiments of the invention, controller 700 may include, among other things, a recoil actuator 702, a controller base 710, a linkage 712, a controller anchor 714, a grounding base 720, a linkage 722, and a grounding anchor 724. Controller base 710 may be movably coupled to grounding base 720. In some embodiments, controller base 710 is coupled to grounding base 720 via a hinge (not illustrated in FIG. 7a). In some embodiments, recoil actuator 702 may be coupled to controller anchor 714 and grounding anchor 724 via linkage 712 and linkage 722, respectively. Linkage 712 may be any rigid structure such as a wire through which recoil actuator 702 imparts a force on controller anchor 714. Similarly, linkage 722 may be a rigid structure through which recoil actuator 702 imparts a force on grounding anchor 724.

In some embodiments, recoil actuator 702 is configured to impart a force on controller anchor 714 via linkage 712. In some embodiments, the imparted force is a pulling force 732 that results in a force vector 734, thereby causing the recoil effect. Force vector 734 causes controller base 710 to move in a direction of force vector 734 relative to a body part of user 750 (illustrated in FIG. 7b). In some implementations, controller anchor 714 may be positioned at a discharge end of controller 700. Thus, force vector 734 may cause the recoil effect in a direction from the distal end of controller 700 toward a user grasping controller 700.

In some embodiments, force vector 734 may cause a force vector 744 to be imparted on grounding base 720. For example, recoil actuator 702, linkage 712 and linkage 722 may be coupled to a wound spool such that pulling force 732 causes force vector 734 and force vector 744. Thus, pulling force 732 may urge together controller base 710 and grounding base 720 according to force vector 734 and force vector 744.

Figure 7B:
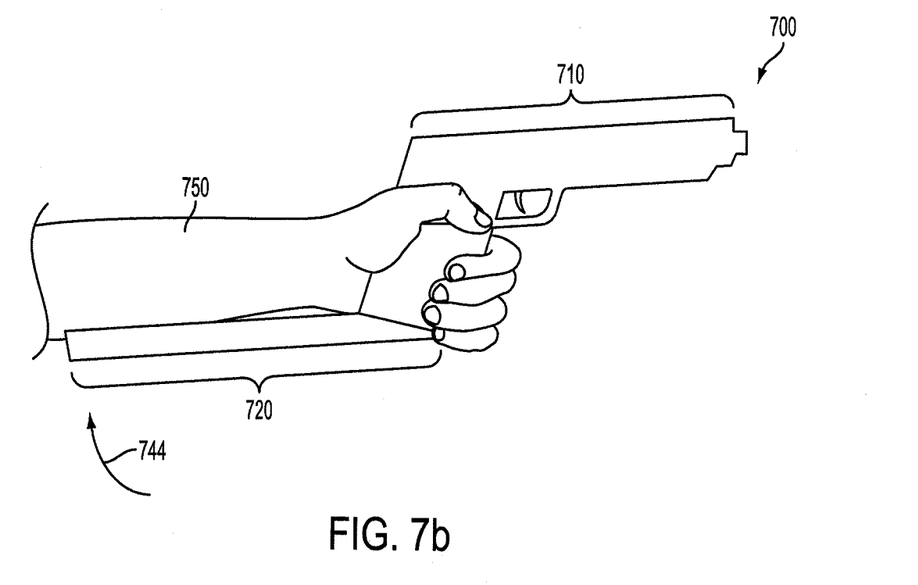
FIG. 7b is a block diagram of a controller that generates a user-grounded recoil effect as held by a user, according to various embodiments of the invention.

When controller 700 is configured to be grasped by user 750 as illustrated in FIG. 7b, grounding base 720 may contact a body part of user 750 when urged upward by vector force 744. Thus, the body part of user 750 blocks a path of grounding base 720 and therefore a user engaging portion may not be needed. In some embodiments, controller may nonetheless include a user engaging portion (not illustrated in FIG. 7b).

In some embodiments, recoil actuator 702 is configured to impart a force on grounding anchor 724 via linkage 722. In some embodiments, the imparted force is a pulling force 742 that results in a force vector 744. Force vector 744 causes grounding base 720 to move in a direction of force vector 744 relative to a body part of user 750 (illustrated in FIG. 7*b*).

In some embodiments, recoil actuator 702 imparts a combination of force vector 734 and force vector 744 to thereby impart the recoil effect. In some embodiments, the magnitude of forces generated by recoil actuator 702 may be varied to simulate different levels of recoil effects, such as a greater recoil effect for a larger simulated gun as compared to a smaller simulated gun.

FIG. 7*b* illustrates a controller 700 that generates a user-grounded recoil effect as grasped by user 750, according to various embodiments of the invention. According to the embodiments illustrated by FIG. 7*b*, grounding base 720 (as illustrated in FIG. 7*a*) is positioned such that vector force 744 causes grounding base 720 to move toward a body part of user 650. For example, grounding base 720 is positioned below a forearm of user 750 when controller is grasped in an upright position as illustrated. In these embodiments, a body part of user 750 is positioned in a path that opposes movement of grounding base 720 when vector force 744 is applied, thereby resisting motion of grounding base 720 in a direction of vector force 744. Thus, the body part of user 750 may be used as a ground to impart the recoil effect.

Figure 8A:
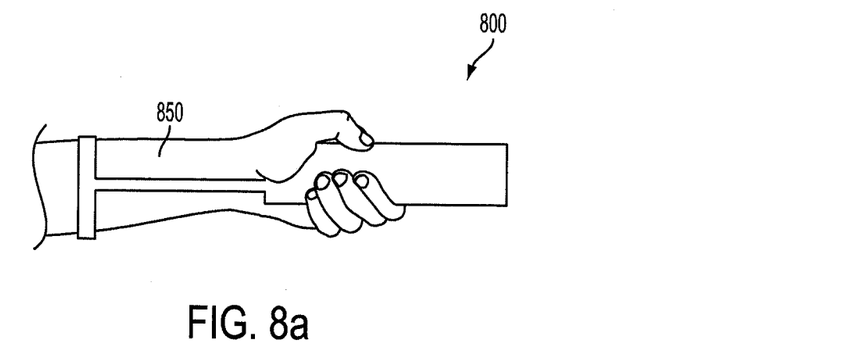
FIG. 8a illustrates a controller that generates a user-grounded recoil effect as grasped by a user, according to various embodiments of the invention.
Figure 8B:
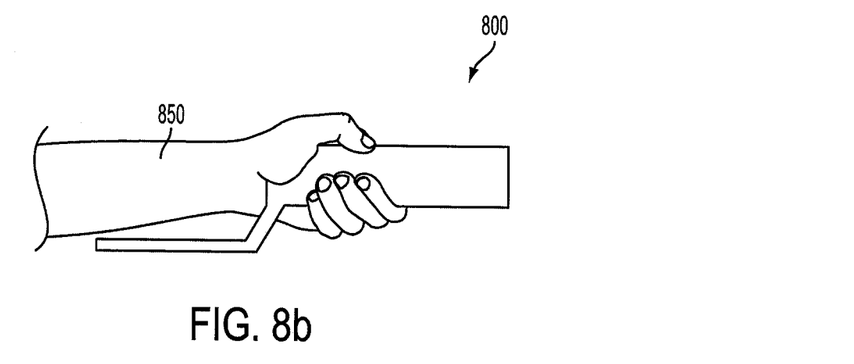
FIG. 8b illustrates a controller that generates a user-grounded recoil effect as grasped by a user, according to various embodiments of the invention.

FIGS. 8*a* and 8*b* illustrate a controller 800 that generates a user-grounded recoil effect as grasped by user 850, according to various embodiments of the invention. According to various embodiments of the invention illustrated by FIGS. 8*a* and 8*b*, controller 800 may be shaped in the form a rectangle or other shape not resembling a gun. In these embodiments, controller 800 may include components described above with respect to controller 600 and controller 700 to provide the recoil effect.

Figure 9:
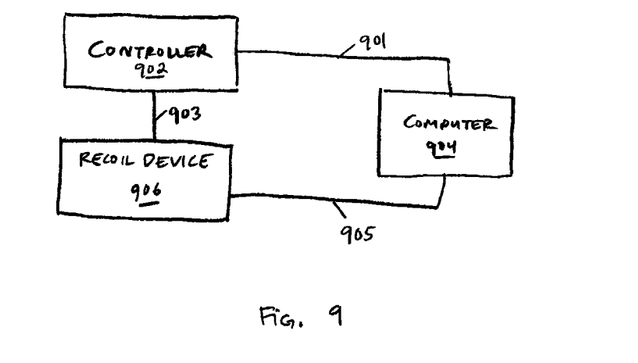
FIG. 9 is a block diagram of a system for providing recoil effects, according to various embodiments of the invention.

FIG. 9 is a block diagram of system 900 for providing recoil effects, according to various embodiments of the invention. According to various embodiments of the invention, system 900 may include, among other things, a controller 902, a computer 904, and a recoil device 906. Controller 902 may be communicably coupled to computer 904 and to recoil device 906 via links 901 and 903, respectively. Recoil device 906 may be communicably coupled to computer 904 via link 905. Links 901, 903, and 905 may be any communication link such as known wired or wireless links. In some embodiments, controller 902 may control an application such as a game running on computer 904, which may be a gaming console. In some embodiments, although illustrated in FIG. 9 as separate devices, controller 902 and computer 904 may include an integrated device such as a handheld gaming device (e.g., SONY PSP).

In some embodiments, recoil device 906 includes an actuator (not illustrated in FIG. 9), such as actuator 122 described above, configured to output haptic feedback. In some embodiments, recoil device 906 is remote from controller 902. In other words, recoil device 906 may be a standalone device that generates recoil effects to a user. In some embodiments, recoil device 906 may be coupled to the user. For example, recoil device 906 may be worn on a body part of the user, contacted by a foot of the user such as by the user standing on recoil device 906, or otherwise be coupled to the user.

In some embodiments, recoil device 906 responds to input from controller 902. In these embodiments, recoil device 906 is coupled to controller 902 and receives an input signal, such as a trigger signal, from controller 902. The trigger signal may be generated in response to a gun shot being simulated such as when a user manipulates a user interface member (not illustrated in FIG. 9) of controller 902 to simulate pulling a trigger of a gun. In response to the input signal received from controller 902, recoil device 906 may impart a haptic effect to the user, thereby generating a recoil effect to simulate a recoil of a gun.

In some embodiments, recoil device 906 responds to input from computer 904. In these embodiments, recoil device 906 is coupled to and receives an input signal from computer 904. For example, computer 904 may receive a trigger signal from controller 902 in response to which computer 904 transmits the input signal to recoil device 906. In response to the input signal received from computer 904, recoil device 906 may impart a haptic effect to the user, thereby generating a recoil effect to simulate the recoil.

Figure 10A:
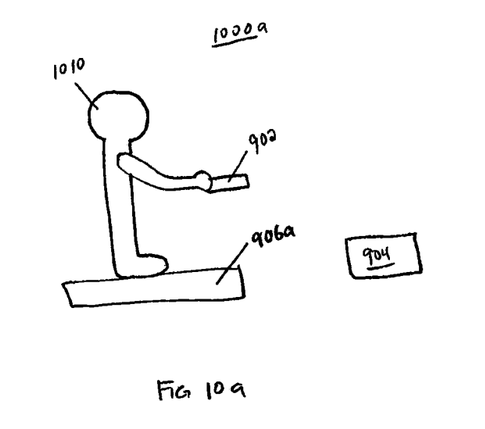
FIG. 10a illustrates a system for providing recoil effects using a recoil device configured as a foot pad, according to various embodiments of the invention.

FIG. 10*a* illustrates a system 1000*a* for providing recoil effects using a recoil device 906*a* configured as a foot pad, according to various embodiments of the invention. According to various embodiments of the invention, a user 1010 may grasp controller 902 while interacting with computer 904 such as when playing a game. User 1010 stands on recoil device 906*a*, which is configured as a foot pad or other device on which user 1010 stands. In these embodiments, recoil device 906*a* may generate haptic force such that a balance of user 1010 shifts. For example, recoil device 906*a* may include one or more force actuators (not illustrated in FIG. 10*a*) that move in response to a trigger signal. Movement of the one or more force actuators may contact a foot of user 1010, altering the balance of user 1010, thereby simulating a recoil effect.

Figure 10B:
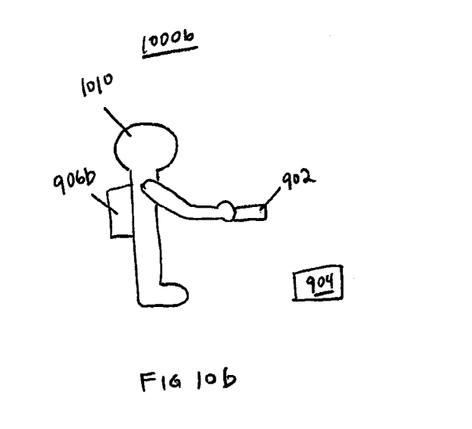
FIG. 10b illustrates a system for providing recoil effects using a recoil device configured as a wearable body device, according to various embodiments of the invention.

FIG. 10*b* illustrates a system 1000*b* for providing recoil effects using a recoil device 906*b* configured as a wearable body device, according to various embodiments of the invention. According to various embodiments of the invention, user 1010 may grasp controller 902 while interacting with computer 904 such as when playing a game. User 1010 may wear recoil device 906*b* on and/or around a body part of user 1010. For example, recoil device 906*b* may be configured as a vest to be worn around a torso of user 1010, a backpack to be worn around a back of user 1010, or other wearable device. In these embodiments, a haptic effect may be imparted to the body part of user 1010 while recoil device 906*b* is worn by user 1010. In this manner, user 1010 may feel the recoil effect at one or more parts of the body of user 1010.

Figure 10C:
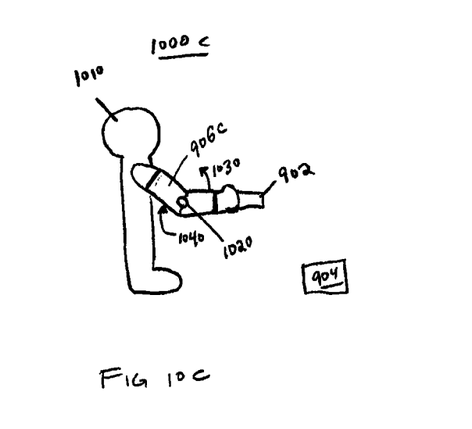
FIG. 10c illustrates a system for providing recoil effects using a recoil device configured as a wearable arm device, according to various embodiments of the invention.

FIG. 10*c* illustrates a system 1000*c* for providing recoil effects using a recoil device 906*c* configured as a wearable arm device, according to various embodiments of the invention. According to various embodiments of the invention, user 1010 may grasp controller 902 while interacting with computer 904 such as when playing a game. User 1010 may wear recoil device 906*c* on and/or around at least a portion of an arm of user 1010. In some embodiments, recoil device 906*c* may generate haptic effects to the arm of user 1010. In some embodiments, recoil device 906*c* may include an actuator 1020 that imparts moving forces 1030 and 1040 on the arm of user 1010 similar in action to actuators 602 and 702 described above in FIGS. 6 and 7, respectively, thereby generating the recoil effect directly on an arm of user 1010.

Although FIGS. 10*a*, 10*b*, and 10*c* illustrate user 1010 grasping controller 906, user 1010 may interact with recoil device 906*a*, 906*b*, and 906*c* in an absence of interacting with controller 906. For example, user 1010 may stand on recoil device 906*a* configured as a foot pad without grasping controller 902. In these embodiments, simulated recoil effects may respond to a trigger signal originating from computer 904 and/or from recoil device 906*a*, such as when recoil device 906*a* includes a user interface member that acts as a trigger. Furthermore, recoil device 906 may be used with other devices and/or controllers disclosed herein as would be apparent to those having skill in the art.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A game controller comprising:
a body having a handle adapted to be grasped by a user;
a trigger coupled to the body adapted to be operated by the user's finger;
a processor within the body and configured to receive a trigger signal from the trigger when the trigger is activated by the user, the processor configured to communicate with a computer running a software program;
a trigger actuator coupled to the trigger, the trigger actuator configured to output a haptic effect to the trigger in response to receiving a control signal from the processor; and
a body actuator coupled to the body, wherein the body actuator is configured to output a haptic effect to at least a portion of the body in response to receiving a control signal from the processor.

2. The controller of claim 1, wherein the body actuator coupled comprises a handle actuator coupled to the handle, wherein the handle actuator is configured to output the haptic effect to at least a portion of the handle in response to receiving the control signal from the processor.

3. The controller of claim 1, further comprising a handle actuator coupled to the handle, wherein the handle actuator is configured to output a haptic effect to at least a portion of the handle in response to receiving a control signal from the processor.

4. The controller of claim 1, further comprising a position sensor coupled to the body, wherein the position sensor tracks at least a position of the body in a three dimensional space.

5. The controller of claim 2, wherein the position signal from the position sensor is transmitted to the computer, wherein a displayed image of a weapon corresponding to the controller is updated in response to the position signal.

6. The controller of claim 1, wherein the body is configured to engage an external detachable body component, wherein the detachable body component is configured to represent a weapon part.

7. The controller of claim 6, wherein the detachable body component further comprises a body component actuator configured to output a haptic effect in response to receiving a control signal from the processor.

8. The controller of claim 1, further comprising a touch sensor coupled to the body, wherein the touch sensor is configured to output a touch sensor signal to the computer when the touch sensor detects the user's hand is in contact with the touch sensor, wherein a displayed image of a weapon corresponding to the controller is updated in response to the touch sensor signal.

9. The controller of claim 1, wherein the body further comprises: a cartridge loader configured to receive a removable cartridge; and a loader sensor coupled to the cartridge loader and configured to detect engagement and disengagement from the cartridge loader, wherein the loader sensor is configured to output a loader sensor upon detecting the engagement or disengagement of the cartridge with the cartridge loader.

10. The controller of claim 1, wherein the body further comprises: a slider configured to be moveable in a first direction and a second direction opposite to the first direction along the body; and an actuator coupled to the slider and configured to output a haptic effect in response to receiving a control signal from the processor.

11. The controller of claim 1, wherein the body is made of a material configured to gradually expand and contract in response to a signal received from the processor.

12. The controller of claim 1, wherein the body includes a light emitting mechanism configured to gradually produce a light in response to a signal received from the processor.

13. A game system comprising:
a computer configured to operate a software program;
a controller further comprising:
a body having a handle adapted to be grasped by a user;
a trigger coupled to the body adapted to be operated by the user's finger;
a processor within the body and configured to receive a trigger signal from the trigger when the trigger is activated by the user, the processor configured to communicate with the computer;
a trigger actuator coupled to the trigger, the trigger actuator configured to output a haptic effect to the trigger in response to receiving a control signal from the processor; and
a body actuator coupled to the body, wherein the body actuator is configured to output a haptic effect to at least a portion of the body in response to receiving a control signal form the processor.

14. The system of claim 13, further comprising a foot pad coupled to the computer, the foot pad including a foot pad actuator configured to output a haptic effect in response to the trigger being operated.

15. A method comprising:
sensing movement of a trigger of a gun controller, wherein the trigger is operated by a user;
sending a sensor signal to a processor, wherein the sensor signal is representative of at least a position of the trigger;
outputting a haptic effect via an actuator within the gun controller, the haptic effect based on a control signal received from the processor, wherein the haptic effect includes a position-based component based on the sensor signal representative of at least the position of the trigger.

16. The method of claim 15, wherein the haptic effect includes the position-based component and a time-based component.

17. The controller of claim 1, the controller having a shape of a weapon.

18. The controller of claim 1, the controller further comprising an air discharging mechanism within the body, the air discharging mechanism in communication with an air discharge nozzle within the body, wherein the air discharging mechanism expels air out the air discharge nozzle upon receiving an activating signal.

* * * * *